(12) United States Patent
Williams et al.

(10) Patent No.: US 6,290,037 B1
(45) Date of Patent: Sep. 18, 2001

(54) VIBRATION ABSORBER USING SHAPE MEMORY MATERIAL

(75) Inventors: Keith A. Williams, Shelburne, VT (US); George Tsu-Chih Chiu; Robert J. Bernhard, both of West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 09/295,717

(22) Filed: Apr. 21, 1999

(51) Int. Cl.[7] .......................................................... F16F 7/10
(52) U.S. Cl. ........................................ 188/379; 73/514.38
(58) Field of Search ................................... 188/379, 378, 188/322.5; 73/514.36, 514.38, 570, 579; 364/508; 701/124

(56) References Cited

U.S. PATENT DOCUMENTS

| | | |
|---|---|---|
| 4,470,121 * | 9/1984 | Ebert ..................................... 364/508 |
| 4,874,215 | 10/1989 | Montagu . | 
| 5,005,678 | 4/1991 | Julien et al. . |
| 5,047,630 * | 9/1991 | Confer ................................... 250/235 |
| 5,168,673 | 12/1992 | Nemir et al. . |
| 5,564,537 * | 10/1996 | Shoureshi ............................. 188/380 |

* cited by examiner

Primary Examiner—Christopher P. Schwartz
(74) Attorney, Agent, or Firm—Woodard, Emhardt, Naughton, Moriarty & McNett

(57) ABSTRACT

The present invention relates to a vibration absorber in which an absorber end mass is coupled to a primary mass by means of a cantilevered beam, wherein at least a portion of the beam comprises a shape memory alloy (SMA). Preferably, the end mass is coupled to the primary mass with several discrete SMA wires which may be individually heated. When each of the SMA wires is heated above a predetermined temperature, the SMA material undergoes a phase change which results in a change in the stiffness of the SMA wire. Heating of the various wires in various combinations allows the operational frequency of the absorber to be actively tuned. The frequency of the absorber may therefore be tuned to closely match the current vibrational frequency of the primary mass, thereby allowing the absorber to be adaptively tuned to the frequency of the primary mass in a simple and straightforward manner.

30 Claims, 8 Drawing Sheets

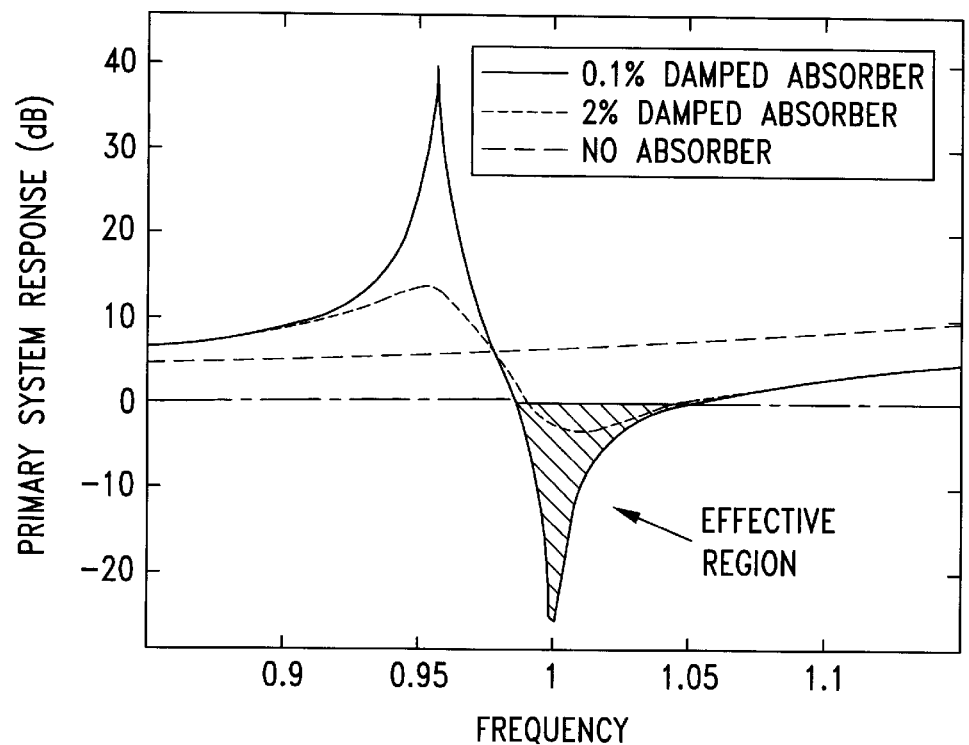
Fig. 3
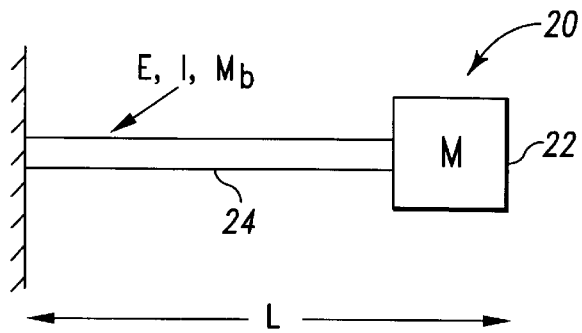
Fig. 4
$M^* = M + 0.24 M_b$
$K^* = \dfrac{3EI}{L^3}$
Fig. 5

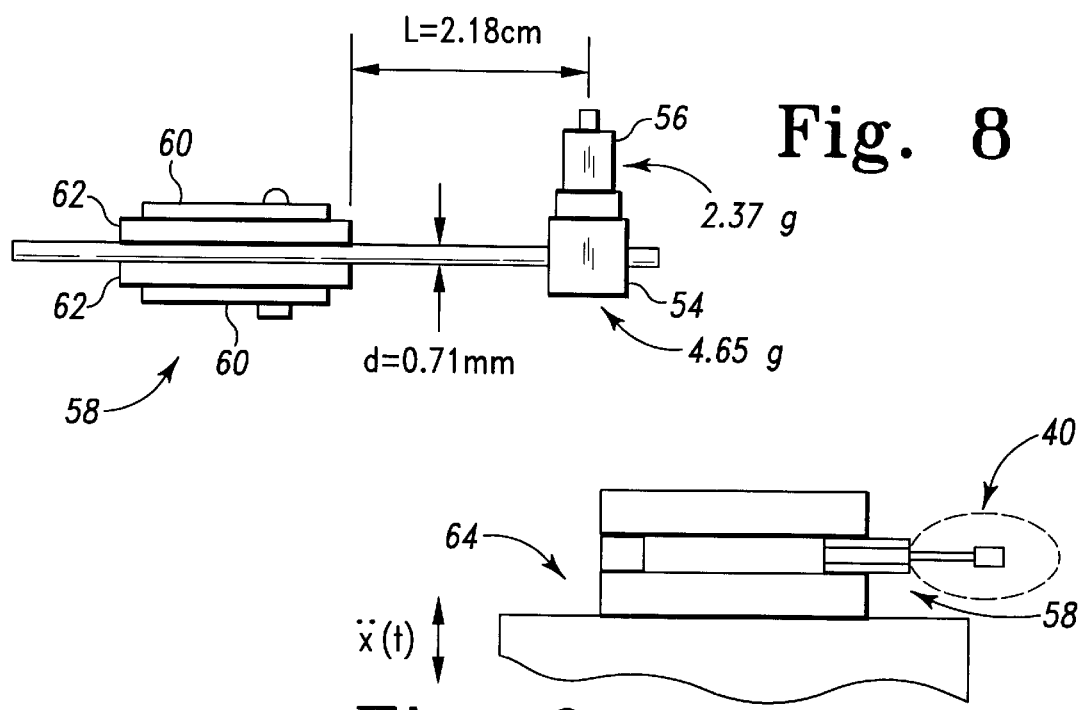
Fig. 8
Fig. 9
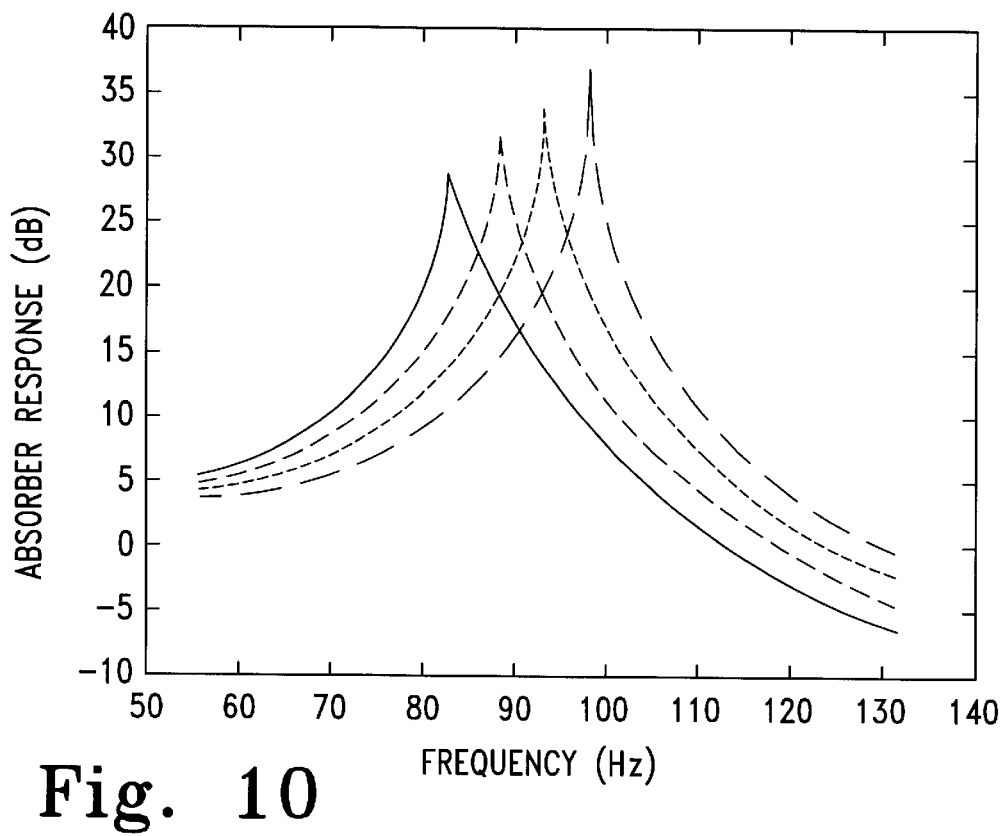
Fig. 10

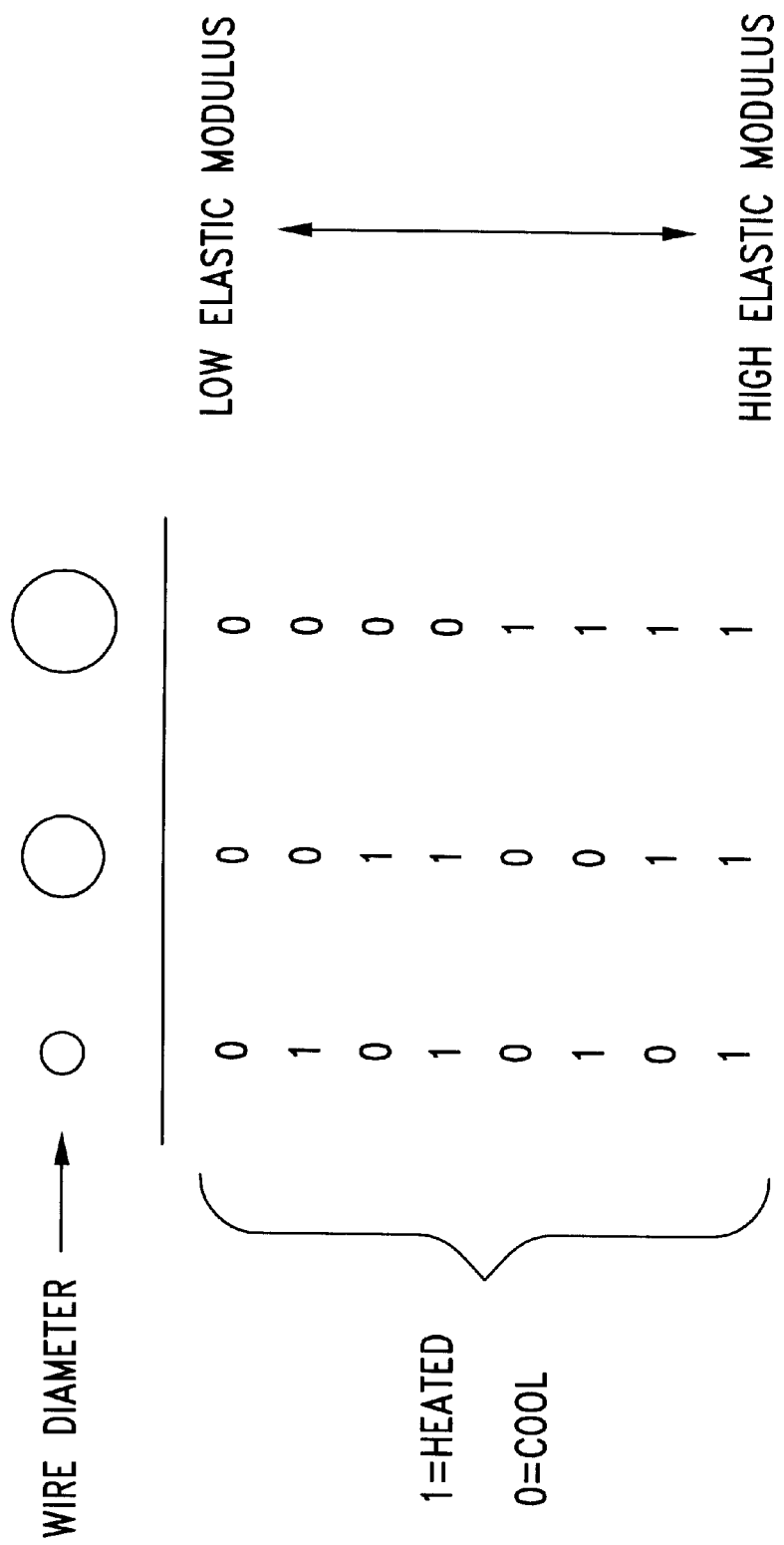

VIBRATION ABSORBER USING SHAPE MEMORY MATERIAL

TECHNICAL FIELD OF THE INVENTION

The present invention generally relates to vibration control devices and, more particularly, to a vibration absorber using shape memory material.

BACKGROUND OF THE INVENTION

Vibration control has been and remains an important field of study in engineering. Most commonly, the goal is the attenuation of the vibration of a primary system. Motivations include the reduction of dynamic stresses on machinery, the isolation of precision devices from shock and vibration, and the reduction of vibration-induced sound. Vibration absorbers are a well-known technique for achieving vibration attenuation in the presence of harmonic disturbances to a system. The greatest merit of vibration absorbers is that they are passive mechanisms that do not require external power or complex control algorithms. The greatest drawback to vibration absorbers is that they are generally effective only within a narrow band of frequencies and may cause large resonances in the frequency response at frequencies just above and below that narrow band. Adaptive absorbers have been designed that address this limitation by moving the effective operating band to match the input frequencies. The difficulty is in finding an adaptive design that is both simple to control and easily manufactured. The ideal absorber is one that incorporates a technology to eliminate moving parts and produce a design with a control logic that is easily implemented.

Vibration control techniques generally fall into one of three areas. These are passive, active, and adaptive-passive. Passive control techniques include the use of tuned-vibration absorbers (TVAs) and isolation mounts. As their name implies, passive techniques do not involve the addition of energy to a system, but rely on the inherent passive characteristics of the system to achieve a specified response. In its simplest form, as shown in FIG. 1, the TVA consists of a secondary mass 10 and spring 12 assembly attached to a primary mass 14 being driven by an external forcing function. Tuning the resonance of the secondary system 10/12 to the driving frequency will result in attenuation of the vibration of the primary mass 14. This effect is shown in FIG. 2, where the dashed line represents the frequency response of an undamped single degree of freedom (sdof) system to an external sinusoidal forcing input. The solid line shows the response with the addition of a vibration absorber with 0.1% of damping ($c_{abs}/m_{abs}=2*\zeta abs*\omega abs$). Also shown is a smaller dashed line that describes the response of the system when fitted with an absorber with 2% damping. For the data shown in FIG. 2, the natural frequency of the primary system is $\omega n=\text{sqrt}(2)$ and the absorber's undamped natural frequency is $\omega abs=1.0$. The absorber's mass was chosen to be 10% of the primary system's mass. Many similar prior art plots show the case of the absorber 10/12 tuned to the natural frequency of the primary system 14. This is not believed to be a fair representation of the use of an absorber 10/12 in practice, as a primary system 14 with a resonance at an operating frequency is an obviously bad design. Rather, the expectation is that the primary system 14 will have been designed without a resonance at the driving frequency and that the absorber 10/12 will be used to attenuate the primary system's response below already non-resonant conditions.

Two significant observations are the addition of the second resonant peak below the absorber's tuned frequency and the effect that the addition of damping has on the resonant peaks and attenuation "notch." The increased damping of the 2% damped absorber 10/12 has the effect of smoothing out the response of the system, such that the resonant peaks are not so large, however it also reduces the depth of the notch where the attenuation of the primary system 14 is significant. The beneficial effect of the absorber 10/12 on the primary system 14 is defined as the reduction in the vibration of the primary system 14. If this reduction is defined as any response below the 0 dB line, then the region where the absorber 10/12 is effective is shown in FIG. 3.

Regarding the history of vibration absorbers, Frahm is credited as the inventor of the vibration absorber, with his 1911 patent. Ormondroyd and Den Hartog later gave a comprehensive treatment of the theory of vibration absorbers, including the effect of damping on absorber performance, in their 1928 paper (Ormondroyd, J. and Den Hartog, J. P., "Theory of the Dynamic Vibration Absorber." Transactions of the ASME, Applied Mechanics Division, APM-50-7, 1928, p. 9–22). Sun et al. provide a more recent study and examples of the application of passive TVAs in industry (Sun, J. Q., Jolly, M. R., and Norris, M. A., "Passive, Adaptive, and Active Tuned Vibration Absorbers—A Survey." Journal of Mechanical Design. Vol. 117B, June 1995, p. 234–242). The authors also describe the draw-back of passive TVAs in the limitation of their effectiveness to fixed bands of frequencies, as shown in FIG. 3. In the presence of uncertainties, which may include time-varying driving frequencies, the effectiveness of the TVAs is substantially reduced and may prove to have negative effects on the vibration of the primary structure.

The two main differences between active and passive control are the need for an external actuator and measurements for implementation of active control, while passive control needs neither. In vibration control, the active control techniques often involve driving the primary system in opposition to the external forcing function, such that the two forcing inputs cancel to produce no net motion of the primary mass. In general, active control techniques suffer from the requirement of input power equal to the disturbance signal. Additionally, active control schemes may require complicated matching of sensors and actuators and have the potential for adding instabilities to the system.

In contrasting passive and adaptive techniques, the passive techniques have the advantage of simplicity of design, reduced complexity, and guaranteed stability. Active techniques have the advantage of being able to control vibration across wider bands of operating frequencies.

Passive-adaptive control methods attempt to combine the positive aspects of the passive and active schemes into a single package. In general, active techniques are used to modify the passive characteristics of the primary system. In recent years, increasing research has been performed concerning the use of adaptable TVAs (ATVAs). Active modification of the absorber stiffness provides for a device that is on-line tunable for operation at different frequencies. The bandwidth of operation varies with the technique used for the active stiffness modification. A good example of a passive adaptive absorber is the design detailed in Franchek et al. (Franchek, M. A., Ryan, M. W., and Bernhard, R. J., "Adaptive Passive Vibration Control." Journal of Sound and Vibration, vol. 189, no. 5, 1995, p. 565–585). In this design, the stiffness of the absorber's spring is "dialed-in" by means of screwing the helical spring through a hole in a fixed plate. The spring stiffness is inversely dependent on the number of coils, so a softer spring may be achieved through screwing greater lengths of spring through the plate. A softer spring lowers the frequency of operation of the absorber, thereby allowing a tunable vibration absorber to be implemented.

Many adaptive passive absorber designs may suffer reliability limitations due to the complexity of their design and operation. There is therefore a need for an adaptive-passive absorber design that avoids the use of mechanisms that are unreliable and/or costly. The present invention is directed toward meeting this need.

SUMMARY OF THE INVENTION

The present invention relates to a vibration absorber in which an absorber end mass is coupled to a primary mass by means of a cantilevered beam, wherein at least a portion of the beam comprises a shape memory alloy (SMA). Preferably, the end mass is coupled to the primary mass with several discrete SMA wires which may be individually heated. When each of the SMA wires is heated above a predetermined temperature, the SMA material undergoes a phase change which results in a change in the stiffness of the SMA wire. Heating of the various wires in various combinations allows the operational frequency of the absorber to be actively tuned. The frequency of the absorber may therefore be tuned to closely match the current vibrational frequency of the primary mass, thereby allowing the absorber to be adaptively tuned to the frequency of the primary mass in a simple and straightforward manner.

In one form of the invention, a vibration absorber coupled to a primary mass for absorbing a vibration of the primary mass is disclosed, the vibration absorber comprising a tuning mass; and at least one shape memory element coupled between the primary mass and the tuning mass; wherein a frequency band of vibration absorbed from the primary mass by the vibration absorber may be tuned by heating the shape memory element. In another form of the invention, a vibration absorber coupled to a primary mass for absorbing a vibration of the primary mass is disclosed, the vibration absorber comprising a tuning mass; a first shape memory element coupled between the primary mass and the tuning mass; and a second shape memory element coupled between the primary mass and the tuning mass; wherein a frequency band of vibration absorbed from the primary mass by the vibration absorber may be tuned by heating only the first element, only the second element, or both the first and second elements.

In yet another form of the invention, a vibration absorber coupled to a primary mass for absorbing a vibration of the primary mass is disclosed, the vibration absorber comprising an tuning mass; a first pair of shape memory wires coupled between the primary mass and the tuning mass; a second pair of shape memory wires coupled between the primary mass and the tuning mass; a pair of non-shape memory wires coupled between the primary mass and then tuning mass; a sensor coupled to the primary mass and operative to sense a frequency of vibration of the primary mass; a first current source coupled to the first pair of shape memory wires; a second current source coupled to the second pair of shape memory wires; and a processor coupled to the sensor and to the first and second current sources, the processor operative to control the first and second current sources in response to an output received from the sensor; wherein a frequency band of vibration absorbed from the primary mass by the vibration absorber may be tuned by heating only the first pair of shape memory wires by passing a first current therethrough, by heating only the second pair of shape memory wires by passing a second current therethrough, or by heating both the first and second pair of shape memory wires by passing the first and second currents therethrough, respectively.

In another form of the invention, a method for controlling a vibration absorber incorporating a shape memory element therein is disclosed, comprising the steps of: a) sensing a vibration of the absorber; b) heating the shape memory element to a first temperature in order to stiffen the vibration absorber relatively quickly; c) determining when the vibration of the absorber has been attenuated by at least a predetermined amount; d) reducing the heating of the shape memory alloy element to a second temperature; e) wherein the first temperature is greater than the second temperature; and f) wherein the second temperature is great enough to cause the shape memory element to continue to exhibit a shape memory effect.

BRIEF DESCRIPTION OF THE DRAWINGS

FIG. 3 is a close-up of a portion of the graph of FIG. 2, showing the effective region of the absorber of FIG. 1.

FIG. 4 is a schematic diagram of a mass-ended cantilevered beam absorber.

FIG. 5 is a schematic diagram of the system of FIG. 4 treated as a simple lumped-mass single degree of freedom system.

FIG. 8 is a schematic side-elevational view of the absorber of FIG. 7.

FIG. 9 is a schematic side-elevational view of the absorber of FIG. 7 coupled to an electromagnetic shaker.

FIG. 10 is a graph of the response of the absorber of FIG. 7 versus frequency for various levels of heating of the SMA wires.

FIG. 17 is a schematic diagram and table of a digital tuning method of the present invention.

DETAILED DESCRIPTION OF THE PREFERRED EMBODIMENTS

Figure 1:
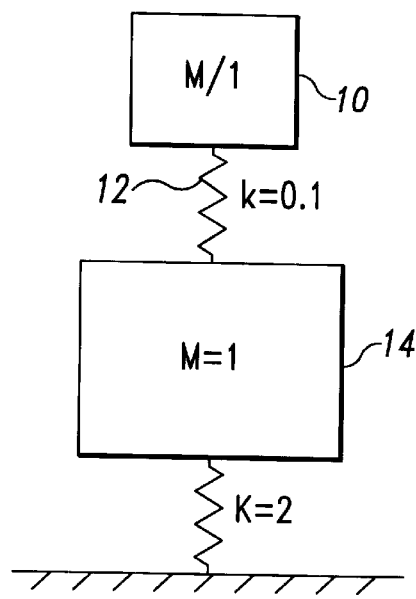
FIG. 1 is a schematic diagram of a tuned-vibration absorber.
Figure 2:
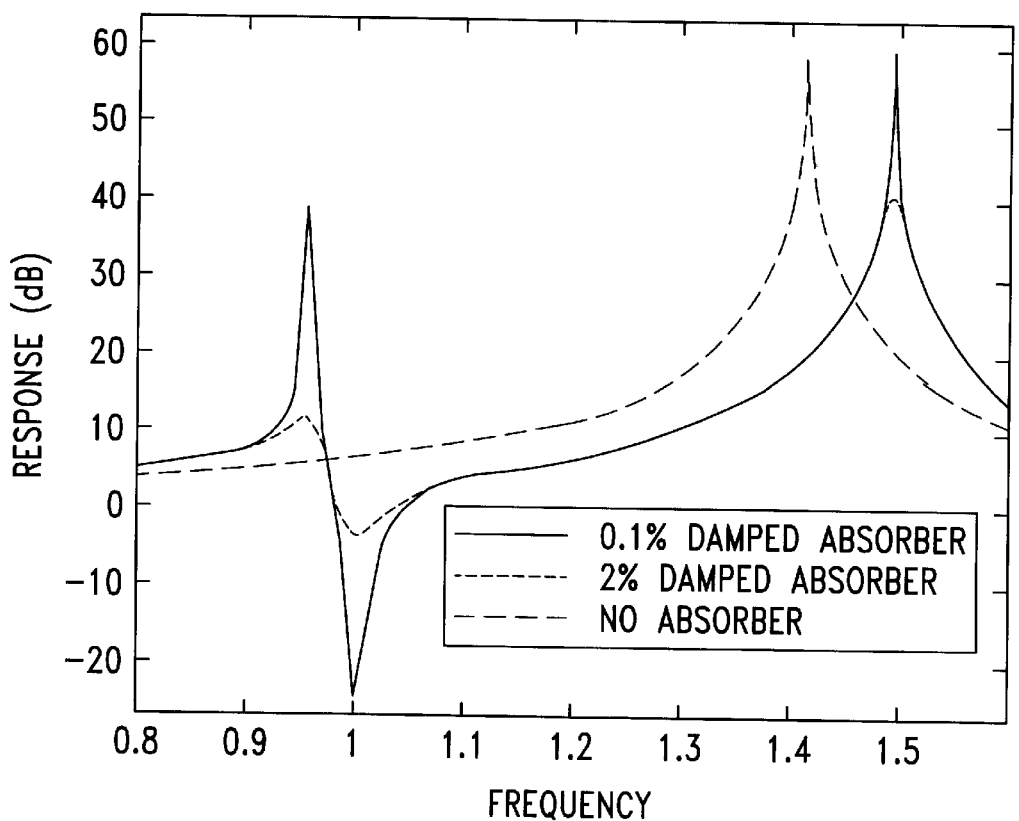
FIG. 2 is a graph of the response versus frequency of a vibration absorber including damping.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Shape memory alloys (SMA) are a class of alloys exhibiting the shape memory effect (SME). SMA is an alloy that undergoes a reversible phase change. The present description discusses only the SMA Nitinol, an alloy of nickel and titanium, discovered at the U.S. Naval Ordinance Laboratories; however, those having ordinary skill in the art will recognize that any shape memory material (alloy or nonalloy, metallic or non-metallic) may be employed in the present invention, and the appended claims are intended to cover such alternate materials. For example, shape memory polymers, which respond to temperature in a manner opposite to shape memory alloys, are also comprehended for use with the present invention.

The state of a shape memory alloy is dependent on its temperature. The two phases are martensite and austenite, which generally correspond to the "cold" and "hot" states of the material. In the martensitic state, the metal exhibits a relatively low elastic modulus and yield strength, beyond which the material may be plastically deformed. Subsequent heating of the material induces the phase change to austenite, with a correspondingly higher elastic modulus and yield strength. In its "hot" state, SMA exhibits an elastic modulus that is as much as three times that of the "cold" state. The net effect is that when unrestrained, the heated material will "remember" its original zero-stress condition, and revert to that shape. Restraining the metal during heating will induce stresses in the material, the magnitude of the stresses dependent upon the initial plastic strain. Values of the elastic modulus of Nitinol are shown in Table 1, along with the elastic modulus for structural steel.

TABLE 1

Elastic Moduli of Nitinol and Steel

|  | Elastic Modulus (ksi) |
|---|---|
| Nitinol: | |
| Martensite: | 4000–6000 |
| Austenite: | 12000 |
| Structural Steel: | 29000 |

It should be noted that the shape memory alloy Nitinol displays a hysteresis effect during heating and cooling in the transition between the martensite state and the austenite state. For example, when Nitinol is heated, it is necessary to elevate the Nitinol above a first temperature threshold in order to induce the phase change to austenite. When cooling the Nitinol in order to induce a phase change back to martensite, the threshold temperature at which this phase change occurs is lower than the first temperature at which the phase change occurred in the opposite heating direction. When using such a shape memory element in the present invention, it is necessary to account for this hysteresis effect in order to achieve proper operation of the vibration absorber.

The prior art generally defines two classifications for the use of SMA in vibration control. The first is active properties tuning (APT), where the change in the elastic modulus of SMA with heating is used. The construction of composite plates and beams, with embedded SMA has been described. Resistive heating of the SMA is accomplished through application of an electrical potential across the SMA wires. This heating changes the elastic modulus of the SMA elements, with a corresponding stiffening of the plate and a change in the plate's natural frequencies and mode shapes. The other classification used in the prior art is active strain energy tuning (ASET). In this application, the SMA is given an initial plastic strain before being embedded in the composite material. Heating of the SMA then results in in-plane forces within the composite, with subsequent changes in the structure's natural frequency and mode shapes.

Both the ASP and the ASET techniques, as described above, are implemented on the primary system. The necessity to modify the primary system represents several drawbacks. Among these is the fact that embedding the vibration control within the system requires that vibration control be provided from the beginning of the design phase of the primary system, which is not always possible. Furthermore, modification of the primary system to the extent necessary for such embedded systems is normally not practical for retrofit solutions.

There is therefore a need for a vibration absorber that may be easily attached to the primary system without substantial modification to the design of the primary system.

The present inventors have determined that the properties of SMA may be used to create a tunable vibration absorber with a variable tuning frequency. This represents a passive-adaptive approach to the issue of vibration control, as the absorber is acting as a passive element in influencing the vibration of the primary system. The use of the SMA would provide an absorber that could adapt to attenuate harmonic excitation of a primary system across a band of frequencies. To realize this adaptively tunable design, SMA was chosen as a spring material for the absorber.

Many spring designs have been proposed and studied for use in vibration absorbers. In particular, the mass-ended cantilevered beam offers a very simple realization of the spring-mass system for use as a vibration absorber. Such a mass-ended cantilevered beam is illustrated schematically in FIG. 4 and indicated generally at 20. The system 20 includes an end mass 22 having a mass M and a cantilevered beam 24. The first natural frequency of a mass-ended cantilevered beam is given by:

$$\omega^2 = \frac{3EI}{L^3(M + 0.24 M_b)} \quad (1)$$

Where $E$ = elastic modulus $I$ = cross-sectional inertia $M$ = mass of the end mass 22

$M_b$ = mass of the beam 24

Using this equation, and assuming that only the first mode is of interest, the mass-ended cantilevered beam 20 may be treated as a simple lumped-mass sdof system as shown in FIG. 5, where:

$$\omega = \sqrt{\frac{K^*}{M^*}} \quad (2)$$

To create an adaptively tuned absorber, a variable spring is needed. Considering the equation from FIG. 5 for the spring stiffness $K^*$ in a mass-ended cantilevered beam, the variable elastic modulus of SMA provides a direct modification of the spring stiffness, through the heating and cooling of SMA beam elements. As noted above, the elastic modulus of SMA varies by a factor as high as three, when the SMA is heated above the threshold temperature. In turn, this results in a change in the effective stiffness of a beam composed of SMA. Considering the extreme cases of a beam composed entirely of SMA, heating the beam through the temperature threshold would result in a stiffness change by a factor as high as three. Further, as the natural frequency of such a system varies as the square root of the stiffness, such a beam would theoretically experience a change in natural frequency of approximately 73%.

Two limitations exist here. The first is the large change in the natural frequency with actuation. Rather than such a large shift in the natural frequency, which would result in two distinct, widely separated notches in the frequency response of the primary system, the goal is to widen the single notch created by the absorber, such that attenuation is possible across a continuous band of frequencies. The present inventors have developed a solution to this problem by using multiple SMA elements and actuating them incrementally. For example, a beam composed of three separate SMA elements, that can be actuated independently, would then have the same overall change in natural frequency, between the "all-cold" and "all-hot" states of the SMA. Between those extremes, however, there will be an additional two states, corresponding to the actuation of one and then two of the elements. Assuming comparable authority for each of the beam elements, the four stiffnesses and the corresponding natural frequencies are shown in Table 2, below.

TABLE 2

Natural Frequency with Various Levels of SMA Actuation

| Stiffness: | Equivalent Stiffness: | Natural Frequency: |
| --- | --- | --- |
| 3 $K_{cold}$ | 3 $K_{cold}$ = K1 | $\omega_1$ |
| 2 $K_{cold}$ + $K_{hot}$ | 5 $K_{cold}$ = 5/3 K1 | 1.29 $\omega_1$ |
| $K_{cold}$ + 2 $K_{hot}$ | 7 $K_{cold}$ = 7/3 K1 | 1.53 $\omega_1$ |
| 3 $K_{hot}$ | 9 $K_{cold}$ = 3 K1 | 1.73 $\omega_1$ |

The second limitation is that, as noted above, SMA has a relatively low yield strength (10000–20000 psi, as compared with 36000 psi for structural steel). For use as a spring material, where displacements may be significant, this represents a strain/displacement limitation. For large-stroke applications, plastic yielding will add hysteretic losses to the system, which may be seen as increased damping in the absorber. As seen in FIG. 3, increased damping severely limits the benefits of adding an absorber to a system. The present inventors have determined that one method of dealing with this limitation is to increase the overall stiffness of the beam system through the use of additional, non-SMA material, in parallel with the SMA. In a preferred embodiment, using steel in parallel with SMA creates an absorber with a higher overall stiffness, resulting in a greater force output for a given displacement. It should be understood, however, that the present invention comprehends the use of other non-SMA materials, both metallic and non-metallic. The non-SMA beam elements also have the effect of limiting the authority of the SMA beam elements in dictating the natural frequency of the absorber. This effectively constricts the tuning band of the absorber. In light of the first limitation, listed above, this has the benefit of increasing the tuning resolution about a higher base frequency. The location of the base frequency is determined by the "cold-state" of the absorber, where the stiffness is the sum of the stiffnesses of the steel and the cold SMA elements.

Thus, a preferred embodiment design for an adaptive tunable vibration absorber 30 with solid-state tuning is a mass-ended cantilevered beam constructed of multiple SMA elements 32 and steel elements 34 in parallel. Such a design, attached to a primary mass 36, is schematically illustrated in FIG. 6.

Figure 6:
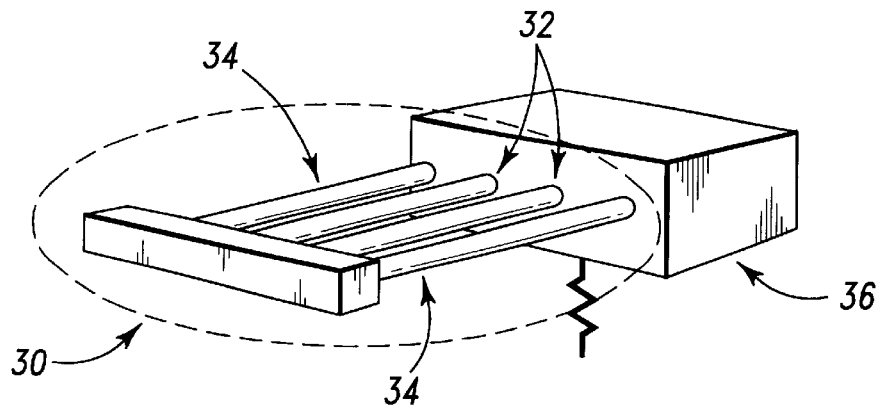
FIG. 6 is a schematic diagram of a preferred embodiment absorber design of the present invention coupled to a primary mass.
Figure 7:
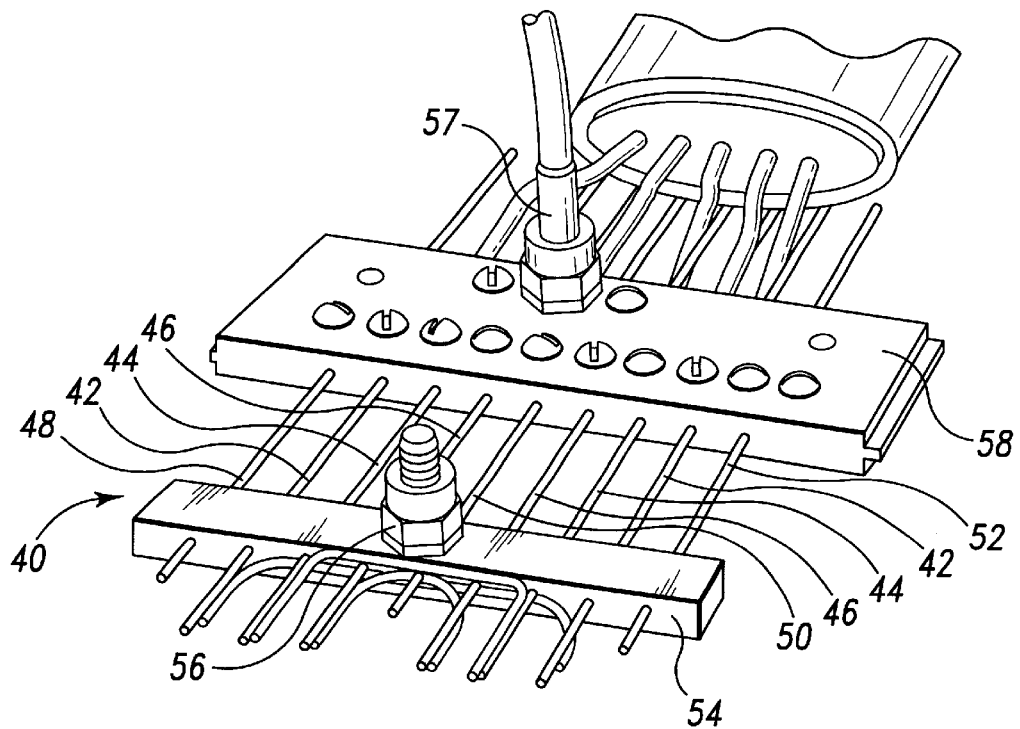
FIG. 7 is a perspective view of a preferred embodiment absorber of the present invention.

In order to test the preferred embodiment design, an absorber 40 was constructed, according to the design of FIG. 6, using SMA wires for tuning elements. As shown in FIG. 7, to investigate the tuning of the absorber across a band, three pairs of SMA wires 42, 44, 46 were used, in parallel with three individual steel wires 48, 50, 52. The wires were embedded into a 4.65 gram end mass 54 used as the tuning mass. The addition of a 2.37 gram accelerometer 56 created an effective end mass, not including the mass of the embedded wire, of approximately 7 grams.

Actuation of the SMA wires was accomplished through the use of a current-controlled power supply (not shown). Analysis of the heat transfer between the SMA wires 42–46 and the ambient temperature laboratory air predicted a required current of approximately 1 amp to maintain SMA temperature above the phase-change threshold of 50 degrees C. Testing showed this to be an adequate current, although during tests of the absorber 40, higher currents were used to ensure actuation of the SMA wires 42–46. The SMA wires 42–46 were actuated in pairs for two reasons. First, with the panel-like geometry shown in FIG. 7, actuation of an off-center SMA would result in an skewed distribution of stiffness about the vertical axis of the absorber 40. It was believed that this would have effects of exciting undesired torsional modes of vibration. The other reason for the use of the SMA wires 42–46 in pairs was the reduction of wiring harness that was achieved by conductively coupling the SMA wire pairs together at their ends adjacent the end mass 54, thereby creating a current-carrying loop for resistive heating. Using the SMA beam elements 42–46 as the conductors of current through the absorber 40 eliminated the need for additional current-carrying wires in the design.

The length of the absorber wires 42–46 between the fixture 58 and the inside edge of the end-mass 54 was 1.87 cm. The width of the end-mass 54 was 0.64 cm. The length of the absorber 40 was measured to the centroid of the end-mass 54, resulting in an absorber 40 beam-length of 2.18 cm. As shown in FIG. 8, the absorber fixture 58 consisted of two brass plates 60, separated by two phenolic plates 62 that served as electrical insulation, to keep the current from short-circuiting through the brass plates 60. Grooves were milled into the phenolic plates 62 that served to align the absorber wires. Screws were used between each of the grooves, to clamp the absorber in the fixture 58.

As shown in FIG. 9, testing of the absorber 40 was performed on an electromagnetic shaker 64. The absorber fixture 58 was clamped to the top of the shaker 64, as shown. Actuation of the absorber 40 was accomplished through resistive heating of the wires 42–46 via a current-regulating power supply (not shown). The supply voltage was put through a switch-box (not shown) that ran an identical current through one, two, or three pairs of the SMA wires 42–46, depending on the switch positions. For cold tests, the power supply was not turned on.

Excitation of the absorber 40 was accomplished through a stepped-sine signal fed to the shaker 64 from a signal analyzer (not shown) and was at a level of 0.5 g, from 59 to 131 Hz, in 0.125 Hz increments. The transfer functions for the absorber 40 at the various levels of heating were calculated by the DSP based on measurements taken from accelerometers 56, 57 on the absorber end-mass 54 and the shaker 64 base. These transfer functions are shown in FIG. 10.

FIG. 10 shows the absorber 40 frequency responses at the various levels of actuation. The natural frequencies vary from approximately 83.55 Hz in the all-cold (non-actuated) state, to 98.0 Hz when totally actuated (all wires 42–46 heated). This represents an increase in the natural frequency form the cold state of approximately 17.4%. It is interesting to note the general shapes of the curves in FIG. 10. With no actuation, the frequency response shows the characteristic shape of the nonlinear response of a "softening spring." With greater actuation, the response peaks grow in magnitude and the general shape appear more like the typical frequency response of a linear system. Heating the wires 42–46 implies increasing the overall stiffness of the system. At the same time, the effective damping is reduced. This may have some effect on the growth of the magnitude peaks with actuation. A more likely reason, however, is the nonlinear response of the SMA 42–46 in its cold state, where the plastic yield strength creates a nonlinear spring effect. For small strains about the zero-yield state, the material 42–46 will act as a linear spring. With larger displacements, however, the restoring force will peak as the material experiences plastic yielding.

To calculate the expected natural frequencies of the absorber 40, Equation (1) was used, but with one modification. FIG. 4 shows the length of the beam measured to the outer edge of the lumped mass 22, as is typical in the prior art. It was not felt that this was an appropriate measure of the length of the beam, in this case, as the lumped mass' thickness is approximately ⅓ the length of the absorber 40 wires from the fixture 58 to the lumped mass 54. Instead, the length of the wires was calculated to the center of the lumped mass 54, as shown in FIG. 8. The measured and predicted results are shown below in Table 3.

TABLE 3

Predicted and Measured Absorber Natural Frequencies

| Actuation Level: | Predicted $\omega_n$ (Hz) | Measured $\omega_n$ (Hz) |
| --- | --- | --- |
| None | 88.8 | 83.5 |
| One pair | 95 | 88.9 |
| Two pairs | 100.8 | 93.5 |
| All three pairs | 106.3 | 98.0 |

Figure 11:
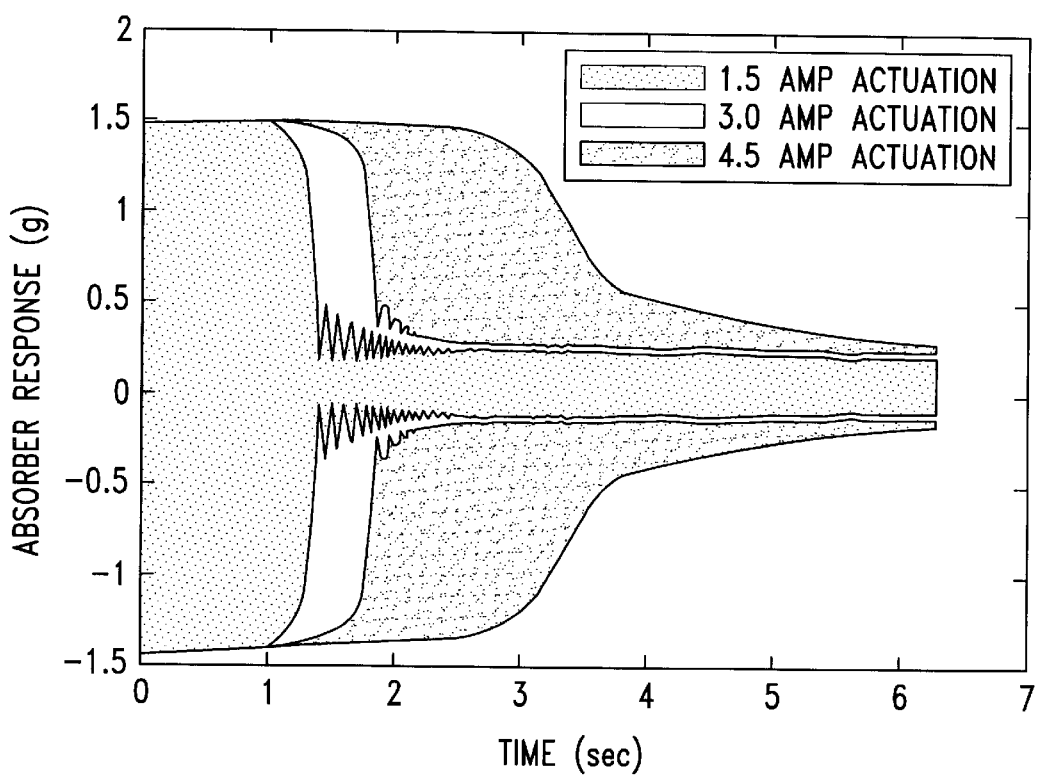
FIG. 11 is a graph of the response of the absorber of FIG. 7 versus time illustrating a speed of the absorber with differing levels of current to actuate heating of the SMA wires.

In FIG. 10 comparison of the two extreme states, the "all-cold" and the "all-hot" states, shows a difference of almost 18 dB between the two responses at 83.5 Hz. This frequency corresponds to the resonant frequency of the all-cold absorber 40. To investigate the time-domain response of the absorber 40, the absorber 40 was driven at this frequency when in the all-cold state. The power supply was then switched on, such that all three pairs of SMA wires 42–46 were actuated. This corresponded to a switch from the all-cold to that all-hot state of the absorber 40. Three current levels were used to perform this test, 1.5, 3.0, and 4.5 amps. The actuation occurred one second after the signal analyzer began recording the response of the system. The time-domain responses to these three actuations are shown in FIG. 11.

Following actuation of the SMA wires 42–46, the magnitude of the response of the absorber 40 was approximately 10% of the magnitude of the response before actuation. This is somewhat better than the 12.6% predicted by the frequency response plots. Another interesting point to note about FIG. 11 is the different responses with the different actuation levels. Actuation for all three levels occurred at the same point in the tests, one second into the record. The 4.5 amp response was relatively rapid, with the response achieving its new state in less than on-half second. The 3.0 amp response was somewhat slower, requiring almost a full second to achieve the actuated state, while the 1.5 amp level as much slower and did not achieve the fully actuated state within the five seconds of actuation shown in the record. These different responses indicate a desirable tuning strategy for the absorber 40 that uses high current levels for a relatively short duration, in order to achieve the actuated state. Once that state is achieved, the current level may be scaled back to that required to maintain the temperature of the SMA wires 42–46 above the threshold temperature of the material.

Figure 12:
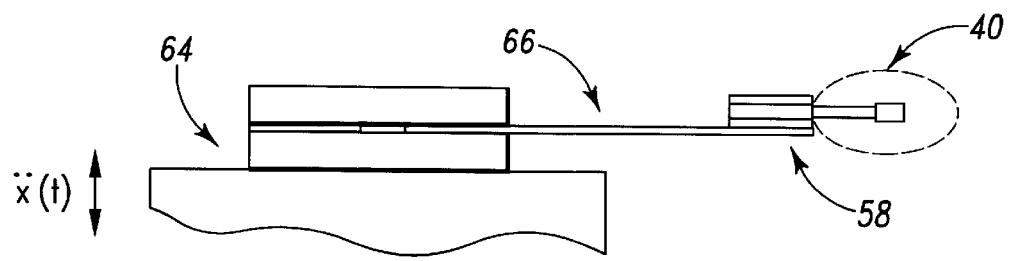
FIG. 12 is a schematic side-elevational view of the absorber of the present invention attached to a primary mass in an experimental setup.

With the absorber 40 characterized, the next step is to implement the absorber 40 on a primary system to see what influence the absorber 40 has in reducing the vibration of that system. To approximate a sdof system to which the absorber 40 could be applied, a second mass-ended cantilevered beam system was used. In this case, the brass absorber fixture 58 represented the lumped mass. The spring element was approximated by an aluminum beam 66 to which the absorber fixture 58 was mounted. The schematic of this setup is shown in FIG. 12.

Figure 13:
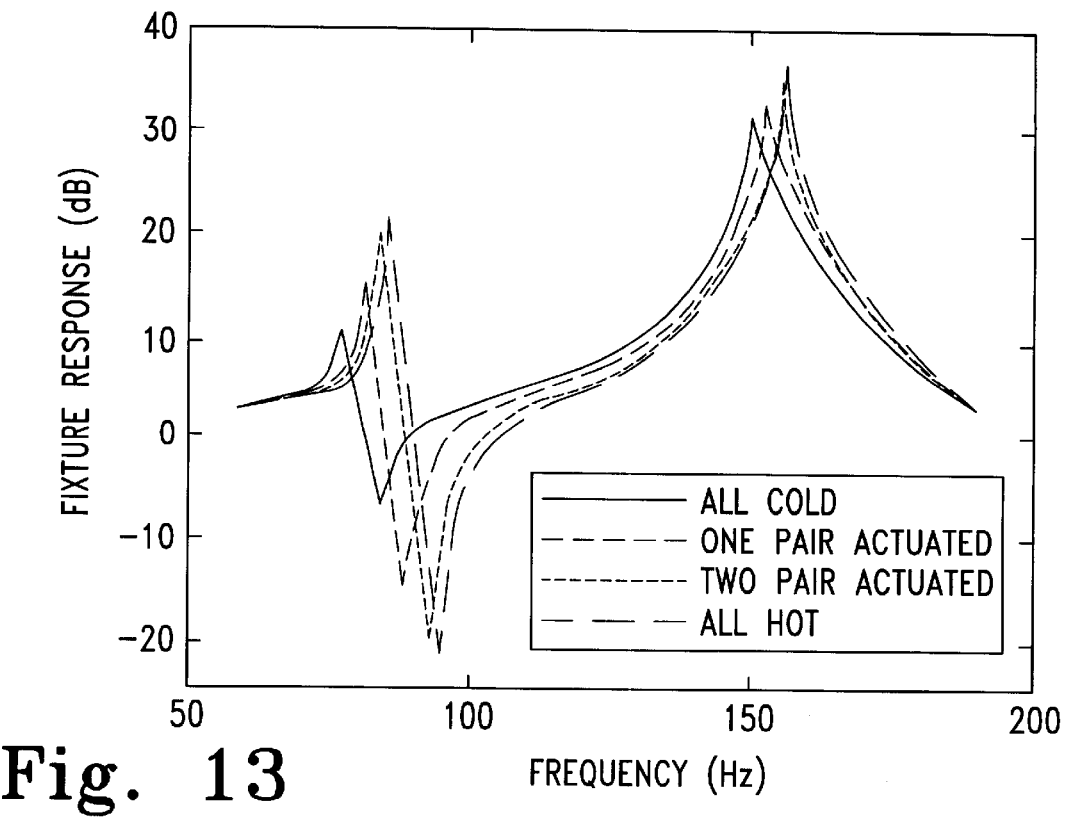
FIG. 13 is a graph of the response of the system of FIG. 12 versus frequency.
Figure 14:
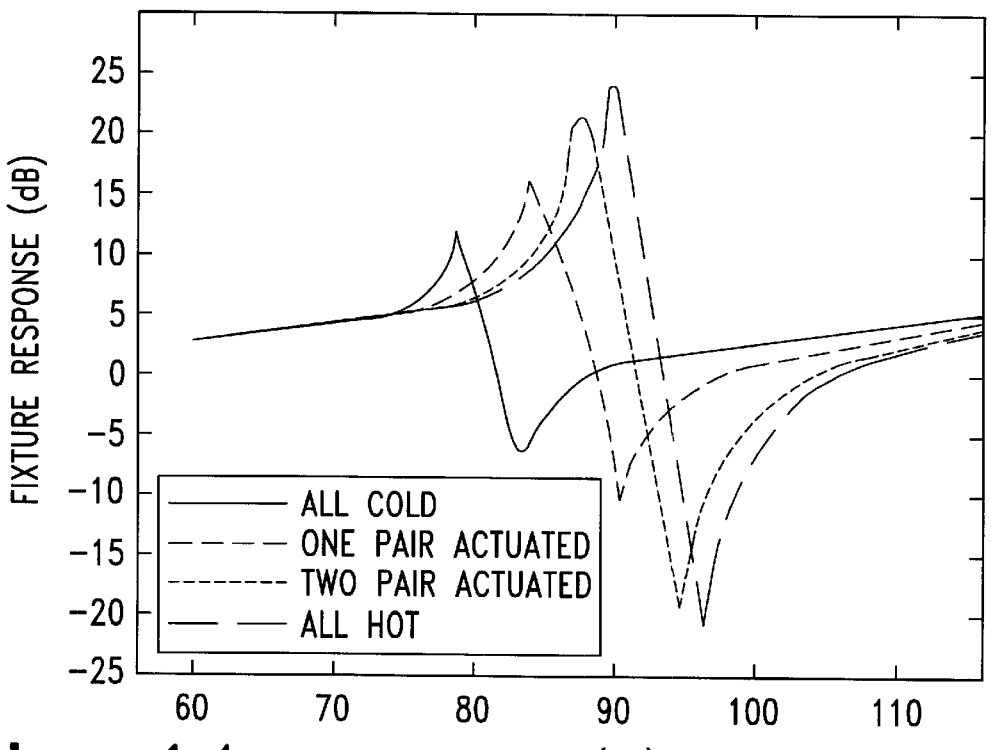
FIG. 14 is a close-up of a portion of the graph of FIG. 13.

Accelerometers were mounted to the absorber fixture 58 and to the shaker 64, which was driven with a stepped-sine input, from 60 to 190 Hz., from the signal analyzer. The spacing of the measurements was every 0.25 Hz, from 60 to 75 Hz, every 0.125 Hz from 75 to 110 Hz, and every 0.25 Hz from 110 to 190 Hz. The reason for the varied spacing of the sampling was the desire for increased resolution in the absorber's operating range. The accelerometer outputs were fed into the DSP which calculated the resulting transfer function between the acceleration of the shaker 64 and the acceleration of the fixture 58. The natural frequency for the mass-ended beam alone (no absorber attached) was approximately 142.5 Hz. To tune the absorber 40 to the natural frequency of the primary system was not seen as an appropriate test of the absorber's effectiveness. It is expected that the design of a primary system will not include vibration-sensitive elements driven at resonance. The transfer functions for the system at various levels of actuation of the absorber 40 are shown in FIG. 13. FIG. 14 is a close-up of FIG. 13, showing the primary system's response over the operating range of the absorber 40.

The various levels of actuation achieve attenuation of the vibration of the primary mass from −7 to almost −20 dB, across an approximately 13 Hz band of frequencies. Also, with increasing actuation of the SMA wires 42–46, the responses show increasingly sharp "peaks" and "notches." This is attributed to the reduced effective damping of the absorber 40 with the stiffening of the SMA wires 42–46. Close examination of FIG. 14 shows that with increasing actuation, the frequency bands between the notches are reduced, from almost 6 Hz between the "All Cold" and "One Pair Actuated" states, to approximately 2 Hz between the "Two Pair Actuated" and "All Hot" states. One possible reason for this may be fraternal heating of the SMA wires 42–46 during the course of the tests. For example, if the epoxy end-mass 54 is acting to conduct heat between actuated and non-actuated wires 42–46, a temperature profile may exist that includes a certain amount of unintended actuation of SMA wires 42–46. This fraternal heating may not have been significant during the absorber 40 characterization tests, due to the shorter duration of those tests. This still does not explain the location of the notch in the "All Hot" frequency response at a frequency below the natural frequency of the absorber 40 in this state.

FIG. 14 does show the distinct notches in the frequency response of the primary system due to the absorber 40. Additionally, the resonant frequency of the primary system is shifted to higher frequencies than the original no-attached-absorber 40 resonant frequency. The figure suggests a simple approach to tuning the absorber 40 in response to a harmonic excitation of increasing frequency. This is to actuate the absorber 40 to higher levels of stiffness as the response at those levels becomes more advantageous. For example, the "All Cold" state is the most appropriate state for frequencies up to approximately 88 Hz. FIG. 14 shows that for higher frequencies, the "One Pair Actuated" state of the absorber 40 will result in greater attenuation than the unactuated state. There are similar cross-over frequencies describing advantageous transitions between the "One Pair Actuated" and "Two Pairs Actuated" and the "Two Pairs Actuated" and "All Hot" states. So, actuation of increasing pairs of absorber wires 42–46 at known cross-over frequencies provides a convenient method of intelligently tuning the absorber 40 to provide the minimal response of the primary system.

Figure 15:
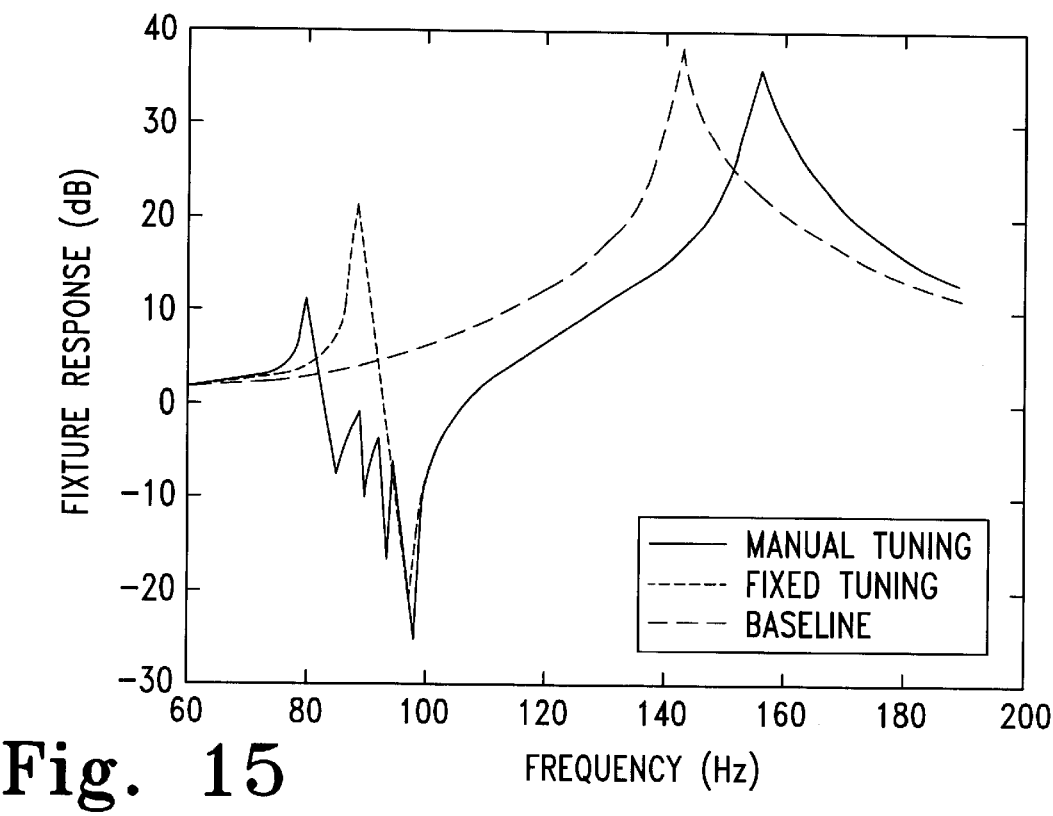
FIG. 15 is a graph of the response of the system of FIG. 12 versus frequency while the absorber is being actively tuned.
Figure 16:
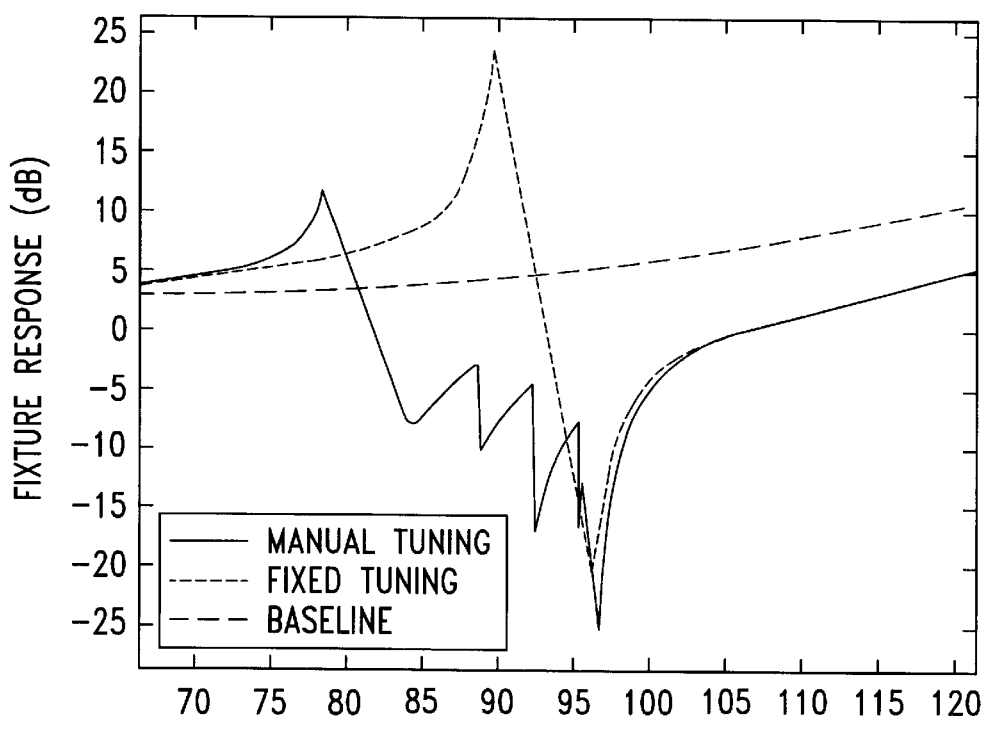
FIG. 16 is a close-up of the graph of FIG. 15.

To test this, the stepped-sine input was again applied to the system of FIG. 12. The absorber 40 was not actuated until a frequency of 88 Hz, at which time the first pair of SMA wires 42–46 was heated. The second and third pairs of wires 42–46 were actuated at 92.625 and 95.625 Hz, respectively. The resulting performance plot of the system is shown in FIG. 15 and is labeled "Manual Tuning," in reference to the method of manual tuning of the absorber 40. Manual tuning involved the operator manually switching the current supply to actuate additional pairs of wires 42–46 at the appropriate frequencies. Two additional performance plots are also shown, for comparison with the manually-tuned absorber 40. These are the "Fixed Tuning" and "Baseline" plots. The fixed tuning plot shows the absorber 40 left in its "All Hot" state, with no actuation of the SMA wires 42–46 during the frequency sweep. The absorber 40 was removed from its fixture 58 for the baseline plot. As such, this plot represents the transfer function of the untreated mass-ended cantilevered beam 66 alone. FIG. 16 is a close-up of FIG. 15, showing the primary system's response over the operating-range of the absorber 40.

A distinction should be made between these "performance plots" and the frequency response plots discussed above. The frequency response plots are indications of the response of the system to excitation at the different frequencies. This excitation may occur across a band of frequencies, or may be random noise. In contrast, the performance plots show the response of the system to a harmonic input of a single, fixed frequency. They do not represent the response of the system to broadband excitation.

Examination of FIG. 16 shows that the manually tuned absorber 40 represents a substantial improvement in performance over the case of the absorber 40 with fixed tuning. Attenuation of the primary system's response is achieved over a much wider frequency band. The result is that the absorber 40 is more effective across a wider window of frequencies than is possible with a fixed absorber. An unanticipated benefit is the reduction of the first peak in the magnitude of the response, due to initial operation with no actuation. A similar effect may be achieved through the use of active dampers that increase the damping of a system through resonance.

Use of the preferred embodiment absorber 40 described hereinabove was by manual activation of the current source used to resistively heat the SMA wires 42–46. It will be appreciated by those having ordinary skill in the art that a more preferred method for use of the absorber 40 is an automated system imploying a processing device such as a microprocessor and associated memory. An accelerometer placed upon the primary mass may provide an input to the microprocessor of the vibrational frequency being exhibited by the primary mass. Based upon this frequency input, the processor may execute an internally stored software program which will determine which of the SMA wires 42–46 should be actuated (heated) in order to tune the frequency of the absorber 40 to most closely match the frequency of vibration of the primary mass. In this way, the absorber 40 may be made automatically responsive to varying vibrational modes of the primary mass, with the microprocessor affecting control of the absorber 40 in order to tune the absorption response to the vibrational frequencies of the primary mass. The design and programming of such a processor-based system will be readily apparent to those having ordinary skill in the art in view of the present disclosure.

Useful variations of the above-described concepts have also been developed by the present inventors. One such variation is the concept of continuous tuning, in which the vibration absorber may be operated in such a way that the SMA wires do not have to be considered as digital entities (i.e. either cold or hot). The concept of continuous tuning recognizes the fact that between the low elastic modulus state (martensite) and the high elastic modulus state (austenite), there lies an intermediate temperature band of approximately 5–10° C. in which the SMA material transitions between these two states according to a predetermined continuous function. By precisely controlling the temperature of the SMA element, it is possible to continuously tune the elastic modulus of the element between its low and high extremes and therefore continuously tune the frequency at which the vibration absorber operates.

A second variation developed by the present inventors involves the concept of digital tuning of a vibration absorber. In this design, the SMA wires may be constructed of differing diameters, such that each wire exhibits different values for its low elastic modulus state and high elastic modulus state. The system controlling the vibration absorber may then choose to heat or cool wires of differing diameters in order to more precisely tune the frequency of the vibration absorber. For example, FIG. 17 illustrates what is possible with a vibration absorber according to the general principles of the preferred embodiment, however utilizing SMA wires having different diameters. In the example of FIG. 17, wires having three different diameters are illustrated; however, the present invention comprehends the use of wires having any number of diameters. Furthermore, as discussed above, it may be desirable to implement wires of different diameters in pairs in order to eliminate torsional vibration concerns. The matrix of ones and zeros below the wire diameters represent a chart specifying whether each of the individual wires is heated or cooled in order to place the wire into one of its two states. A one represents that the wire is heated to its austenite state, while a zero indicates that the wire is cooled to its martensite state. As can be seen from the chart, the wires may be activated and deactivated in various combinations similar to a binary counting sequence that will allow the vibration absorber to transition from a low overall elastic modulus to a high overall elastic modulus in very small, discrete (digital) steps. With such tuning available to the processor controlling the system, it will be possible to more precisely tune the vibration absorber to the desired frequency.

Other modifications of the present invention should be apparent to one having ordinary skill in the art in view of the present disclosure. For example, heating of the SMA wires in the preferred embodiment was accomplished by passing a current through these wires, allowing them to heat up due to the natural resistance of these wires. The present invention also comprehends the use of other heating methods. For example, independent resistive heaters may be placed in close proximity to the SMA elements in order to more rapidly heat those elements. In one embodiment, a resistive wire may be wrapped around each of the SMA elements and current flowed through the resistive wire in order to provide more rapid heating of the SMA element. Other heating methods, such as forced-air heating are also comprehended.

Additionally, the preferred embodiment relies on convective losses to the ambient air to achieve cooling of the absorber 40. As such, while the absorber 40 will eventually achieve effective steady-state operation in the case of a reduction in excitation frequency, a much longer period of mistuning must be tolerated than in the case of heating the absorber to match an increasing excitation frequency. Geometries other than the solid wire SMA are available that may allow for increased cooling rates. Such an example is the hollow SMA currently available that may allow for forced-air cooling of the absorber 40. Active cooling technologies may also be used with the present invention.

An alternate technique to deal with the slower cooling rate may be the use of active stiffness reduction. Materials (such as shape memory polymers, for example) are available that, when heated, experience substantial reductions in their elastic modulus. Judicious use of elements constructed of such materials will result in a design that incorporates active stiffness reduction. The strategy would then be to utilize the active stiffness reduction to drop the stiffness of the system, at the same time as power is removed from some or all of the SMA wires. As the SMA wires cool to the point where this active stiffness reduction is no longer needed, that system may also be phased out.

The question of fraternal heating among the SMA elements also points out the desirability of a feedback temperature controller. In the test described above, temperature feedback consists of an operator monitoring thermocouples attached to the SMA. The operator then increases or reduces the electrical current input to the SMA. Implementation into an autonomous control system should include transfer functions or other similar control models that describe the response of the SMA.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. A vibration absorber coupled to a primary mass for absorbing a vibration of the primary mass, the vibration absorber comprising:
   a tuning mass;
   at least one shape memory element coupled between the primary mass and the tuning mass; and
   at least one non-shape memory element coupled between the primary mass and the tuning mass;
   wherein a frequency band of vibration absorbed from the primary mass by the vibration absorber may be tuned by heating the shape memory element.

2. The vibration absorber of claim 1, wherein the at least one shape memory element comprises a shape memory alloy wire.

3. The vibration absorber of claim 1, wherein the at least one shape memory element comprises a pair of shape memory alloy wires.

4. The vibration absorber of claim 3, wherein the pair of shape memory alloy wires are electrically conductively coupled adjacent the tuning mass.

5. The vibration absorber of claim 4, wherein the pair of shape memory alloy wires are heated by passing an electrical current through them.

6. The vibration absorber of claim 1, wherein the shape memory element comprises Nitinol.

7. The vibration absorber of claim 1, wherein the at least one non-shape memory element comprises a pair of steel wires.

8. The vibration absorber of claim 1, further comprising:
   a sensor operative to sense a frequency of vibration of the primary mass;
   a heater operative to heat the at least one shape memory element; and
   a processor coupled to the sensor and the heater and operative to heat the at least one shape memory element in response to an output received from the sensor.

9. The vibration absorber of claim 8, wherein the sensor comprises an accelerometer.

10. The vibration absorber of claim 8, wherein the heater comprises a current source.

11. A vibration absorber coupled to a primary mass for absorbing a vibration of the primary mass, the vibration absorber comprising:
    a tuning mass;
    a first shape memory element coupled between the primary mass and the tuning mass;
    a second shape memory element coupled between the primary mass and the tuning mass;
    at least one non-shape memory element coupled between the primary mass and the tuning mass; and
    wherein a frequency band of vibration absorbed from the primary mass by the vibration absorber may be tuned by heating only the first element, only the second element, or both the first and second elements.

12. The vibration absorber of claim 11, wherein the first and second shape memory elements comprise a first and second shape memory alloy wire, respectively.

13. The vibration absorber of claim 11, wherein the first and second shape memory elements comprise a first and second pair of shape memory alloy wires, respectively.

14. The vibration absorber of claim 13, wherein:
    the first pair of shape memory alloy wires are electrically conductively coupled adjacent the tuning mass; and
    the second pair of shape memory alloy wires are electrically conductively coupled adjacent the tuning mass.

15. The vibration absorber of claim 14, wherein:
    the first pair of shape memory alloy wires are heated by passing a first current through them; and
    the second pair of shape memory alloy wires are heated by passing a second current through them.

16. The vibration absorber of claim 15, wherein the first and second currents are substantially equal.

17. The vibration absorber of claim 11, wherein the first and second shape memory elements comprise Nitinol.

18. The vibration absorber of claim 11, wherein the at least one non-shape memory element comprises a pair of steel wires.

19. The vibration absorber of claim 11, wherein the first and second shape memory elements have differing elastic moduli when in the same state.

20. The vibration absorber of claim 19, wherein the first and second shape memory elements comprise a first and second shape memory alloy wire, respectively, having different diameters.

21. The vibration absorber of claim 19, wherein the first and second shape memory elements comprise a first and second shape memory alloy cantilevered beam, respectively.

22. The vibration absorber of claim 19, wherein the first and second shape memory elements comprise a first and second pair of shape memory alloy wires.

23. The vibration absorber of claim 19, wherein:

the first shape memory element is heated by passing a first current through it; and the second shape memory element is heated by passing a second current through it.

24. The vibration absorber of claim 19, wherein the first and second shape memory elements comprise Nitinol.

25. The vibration absorber of claim 19, further comprising at least a third shape memory element, the shape memory elements having elastic moduli of their respective states in a relationship to each other such that a total effective elastic modulus of the shape memory elements can be increased by increments by toggling the states of the shape memory elements according to a pattern of binary counting.

26. The vibration absorber of claim 19, wherein the shape memory elements having elastic moduli of their respective states in a relationship to each other and to that of the at least one non-shape memory element such that a total effective elastic modulus of the shape memory elements can be increased by increments by toggling the states of the shape memory elements according to a pattern of binary counting.

27. A method for controlling a vibration absorber incorporating a shape memory element therein, comprising the steps of:

a) sensing a vibration of the absorber;

b) heating the shape memory element to a first temperature in order to stiffen the vibration absorber relatively quickly;

c) determining when the vibration of the absorber has been attenuated by at least a predetermined amount; and d) reducing the heating of the shape memory element to a second temperature;

e) wherein the first temperature is greater than the second temperature; and f) wherein the second temperature is great enough to cause the shape memory element to continue to exhibit a shape memory effect.

28. The method of claim 27, wherein the heating of steps (b) and (d) comprises resistive heating caused by flowing a current through the shape memory element.

29. The method of claim 28, wherein a first current level is applied to achieve the first temperature and a second current level is applied to achieve the second temperature, wherein the first current is greater than the second current.

30. A method for absorbing vibrations in a primary mass, comprising:

providing a vibration absorber coupled to the primary mass, and comprising a first and a second shape memory element having differing elastic moduli, and at least one non-shape memory element;

detecting a frequency of vibrations of the primary mass;

selecting the state for each of the first and second shape memory elements which will cause the vibration absorber to maximally dampen the vibrations of the primary mass;

adjusting a temperature of the first and second shape memory elements so as to cause the first and second shape memory elements to adopt the selected states.

* * * * *